(12) United States Patent
Lee et al.

(10) Patent No.: US 11,748,629 B2
(45) Date of Patent: Sep. 5, 2023

(54) DEVICE AND METHOD OF HANDLING ANOMALY DETECTION

(71) Applicant: Moxa Inc., New Taipei (TW)

(72) Inventors: Wei-Yu Lee, New Taipei (TW); Yu-Chiang Wang, New Taipei (TW)

(73) Assignee: Moxa Inc., New Taipei (TW)

( * ) Notice: Subject to any disclaimer, the term of this patent is extended or adjusted under 35 U.S.C. 154(b) by 85 days.

(21) Appl. No.: 16/867,576

(22) Filed: May 6, 2020

(65) Prior Publication Data

US 2021/0224606 A1 Jul. 22, 2021

Related U.S. Application Data

(60) Provisional application No. 62/964,096, filed on Jan. 21, 2020.

(51) Int. Cl.
*G06T 7/00* (2017.01)
*G06N 3/088* (2023.01)
*G06F 18/21* (2023.01)
*G06F 18/214* (2023.01)

(52) U.S. Cl.
CPC ............ *G06N 3/088* (2013.01); *G06F 18/217* (2023.01); *G06F 18/2155* (2023.01)

(58) Field of Classification Search
CPC .. G06K 9/6262; G06K 9/6259; G06K 9/6256; G06K 9/6284; G06N 3/0454; G06N 3/0472; G06N 3/088; G06T 7/0002; G06T 2207/20081
See application file for complete search history.

(56) References Cited

U.S. PATENT DOCUMENTS

| 10,333,958 | B2 | 6/2019 | Huang | |
| 10,558,913 | B1* | 2/2020 | Turner | G06N 3/047 |
| 2019/0295302 | A1 | 9/2019 | Fu | |
| 2020/0152188 | A1* | 5/2020 | Lee | G10L 15/22 |
| 2020/0356592 | A1* | 11/2020 | Yada | G06F 16/538 |
| 2020/0380027 | A1* | 12/2020 | Aggarwal | G06F 16/538 |
| 2021/0166340 | A1* | 6/2021 | Nikola | G01C 21/3837 |

FOREIGN PATENT DOCUMENTS

| JP | 2019-75108 A | 5/2019 |
| WO | 2019/221654 A1 | 11/2019 |

OTHER PUBLICATIONS

Xiaobin Chang et al., "Multi-Level Factorisation Net for Person Re-Identification", CVF Conference on Computer Vision and Pattern Recognition, 2018 IEEE, Jun. 18-23, 2018, USA, pp. 2109-2118.

Rui Gao et al., Zero-VAE-GAN: Generating Unseen Features for Generalized and Transductive Zero-Shot Learning, IEEE Transactions on Image Processing, Jan. 11, 2020, pp. 3665-3680, vol. 29, IEEE, XP011769284.

* cited by examiner

*Primary Examiner* — John W Lee
(74) *Attorney, Agent, or Firm* — Winston Hsu

(57) ABSTRACT

A computing device for handling anomaly detection, comprises an encoder, for receiving an input image, to generate a first latent vector comprising a semantic latent vector and a visual appearance latent vector according to the input image and at least one first parameter of the encoder; and a training module, coupled to the encoder, for receiving the input image and the first latent vector, to update the at least one first parameter according to the input image and the first latent vector and a loss function.

10 Claims, 5 Drawing Sheets

| Anomaly class / Methods | 0 | 1 | 2 | 3 | 4 | 5 | 6 | 7 | 8 | 9 | Avg |
|---|---|---|---|---|---|---|---|---|---|---|---|
| VAE | 0.525 | 0.145 | 0.658 | 0.284 | 0.354 | 0.351 | 0.425 | 0.175 | 0.504 | 0.164 | 0.359 |
| AnoGAN | 0.610 | 0.300 | 0.535 | 0.440 | 0.430 | 0.420 | 0.475 | 0.355 | 0.400 | 0.335 | 0.430 |
| EGBAD | 0.775 | 0.290 | 0.670 | 0.520 | 0.450 | 0.430 | 0.570 | 0.400 | 0.545 | 0.345 | 0.500 |
| GANomaly | 0.880 | 0.650 | 0.940 | 0.780 | 0.870 | 0.840 | 0.830 | 0.660 | 0.830 | 0.520 | 0.780 |
| IGMM-GAN | 0.955 | 0.900 | 0.930 | 0.820 | 0.830 | 0.900 | 0.930 | 0.900 | 0.780 | 0.570 | 0.852 |
| ODIN | 0.870 | 0.815 | 0.861 | 0.780 | 0.841 | 0.877 | 0.798 | 0.712 | 0.767 | 0.707 | 0.803 |
| The present invention | 0.963 | 0.915 | 0.957 | 0.832 | 0.862 | 0.931 | 0.947 | 0.921 | 0.844 | 0.855 | 0.903 |

FIG. 4

DEVICE AND METHOD OF HANDLING ANOMALY DETECTION

CROSS REFERENCE TO RELATED APPLICATIONS

This application claims the benefit of U.S. Provisional Application No. 62/964,096 filed on Jan. 21, 2020, which is incorporated herein by reference.

BACKGROUND OF THE INVENTION

1. Field of the Invention

The present invention relates to a device and a method used in a multimedia system, and more particularly, to a device and a method of handling anomaly detection.

2. Description of the Prior Art

Anomaly detection aims to distinguish anomalous data (e.g., unusual examples) from normal data, to resolve a distribution mismatch problem. The anomaly detection has been applied to solve problems in several application domains such as bio-medical imaging, video surveillance, automated optical inspection (AOI), etc. Various methods have been proposed for the anomaly detection, to separate the normal data and the anomalous data. However, performance of the methods may be reduced by complex backgrounds or content variants of the normal data and the anomalous data. Thus, an improved method for handing the anomaly detection is needed.

SUMMARY OF THE INVENTION

The present invention therefore provides a device and a method for handling anomaly detection to solve the above-mentioned problem.

A computing device for handling anomaly detection, comprises an encoder, for receiving an input image, to generate a first latent vector comprising a semantic latent vector and a visual appearance latent vector according to the input image and at least one first parameter of the encoder; and a training module, coupled to the encoder, for receiving the input image and the first latent vector, to update the at least one first parameter according to the input image and the first latent vector and a loss function.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a comparison table of experiment results according to an example of the present invention.

DETAILED DESCRIPTION

Figure 1:
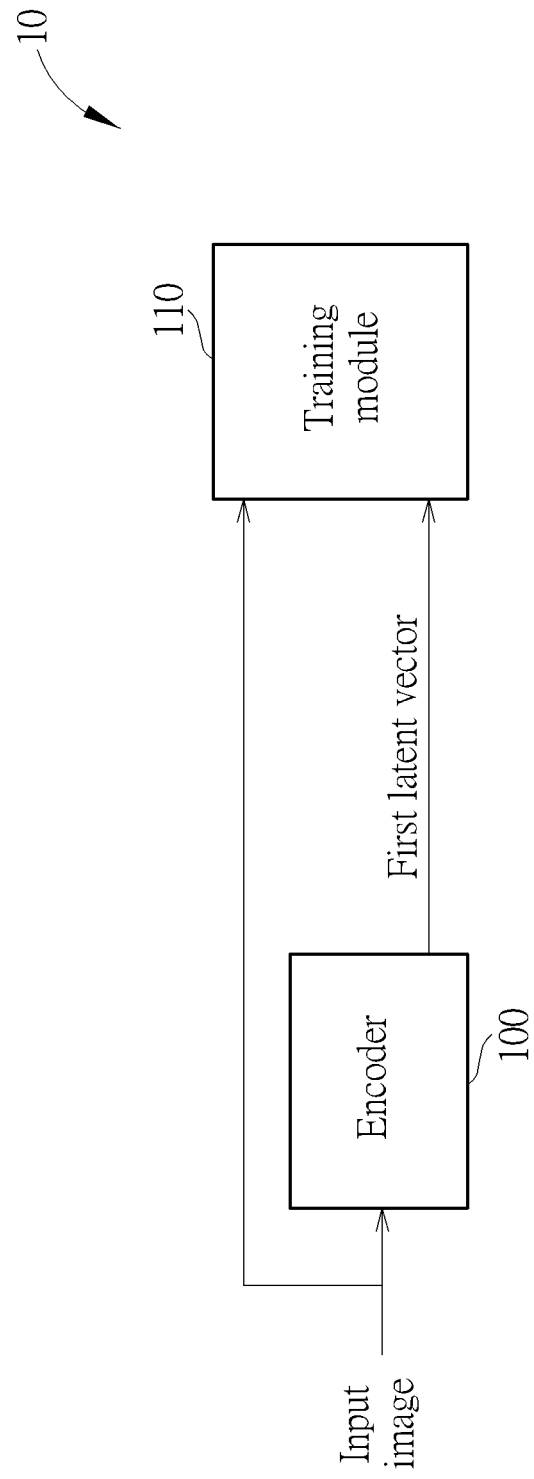
FIG. 1 is a schematic diagram of a computing device according to an example of the present invention.

FIG. 1 is a schematic diagram of a computing device 10 according to an example of the present invention. The computing device 10 includes an encoder 100 and a training module 110. In detail, the encoder 100 receives an input image, and generates a first latent vector (e.g., a latent code or a latent representation) according to the input image and at least one first parameter of the encoder 100, wherein the first latent vector includes a semantic latent vector (e.g., a semantic latent code) and a visual appearance latent vector (e.g., a visual appearance latent code). The training module 110 is coupled to the encoder 100, and receives the input image and the first latent vector. The training module 110 updates the at least one first parameter of the encoder 100 according to the input image, the first latent vector and a loss function.

Methods for anomaly detection may be divided to two categories according to ways for distinguish (e.g., identify) anomalous data (e.g., unusual examples or abnormal data) from normal data. Self-representation methods are designed to measure (e.g., assess or calculate) a reconstruction error between an input (e.g., the input image) and an output (e.g., a reconstructed image) by a L1-norm function or a L2-norm function, to distinguish whether the input is an anomaly (e.g., an outlier, an out of distribution or a novelty). For example, a higher reconstruction error represents that the input is more probably to be an anomaly. However, module(s) of the self-representation methods may be capable of reconstructing visual appearance information (e.g., visual attributes) of the normal data and the anomalous data, and may generate the output according to visual appearance information of the input without semantic information (e.g., categorical features or categorical information) of the input to reduce the reconstruction error. Thus, the reconstruction error may not be a suitable indicator for the anomaly detection.

On the other hand, confidence estimation methods are designed to find a confidence score and a threshold value. For example, an input is determined to be an anomaly, if the confidence score is lower than the threshold value. However, module(s) of the confidence estimation methods may generate a high confidence score (i.e., the high confidence score is higher than the threshold value), when the input is an anomaly. That is, the module(s) of the confidence estimation methods may not generate the confidence score according to semantic information of the input. Thus, the confidence estimation methods may fail to identify the anomalous data. In addition, performance of the both methods may be affected by complex backgrounds or content variants of the normal data or the anomalous data.

The present invention provides a device and a method for the anomaly detection with feature disentanglement (e.g., disentangled features), and aims to disentangle (e.g., separate or distinguish) visual appearance information and semantic information from the normal data or the anomalous data. Thus, the problem that performance of the methods may be reduced by complex backgrounds or content variants of the normal data and the anomalous data is solved.

In addition, the present invention is not only effective for one-class anomaly detection (i.e., all classes in a dataset are treated as the normal data, and a class of others datasets is considered as the anomalous data) but also effective for multi-class anomaly detection (i.e., one class of a dataset is treated as the anomalous data, and the rest of classes of the dataset are considered as the normal data).

In one example, the semantic latent vector comprises semantic information of the input image, and does not comprise visual appearance information of the input image. In one example, the visual appearance latent vector comprises visual appearance information of the input image, and does not comprise semantic information of the input image. That is, the encoder 100 encodes the semantic information and the visual appearance information of the input image into the semantic latent vector and the visual appearance latent vector of the first latent vector, respectively. Thus, the computing device 10 focuses on the semantic information to estimate a confidence score.

In one example, the training module 110 updates the at least one first parameter of the encoder 100, to make the encoder 100 have a better capability for disentangling (e.g., separating) semantic information and visual appearance information from an input image.

In one example, the encoder 100 and the training module 110 are combined to find (e.g., learn) distributions of normal data in a training process (e.g., a disentanglement process). In one example, the semantic latent vector and the visual appearance latent vector are trained to find (e.g., learn) semantic information and visual appearance information from the normal data in the training process, respectively. Through the training process, the encoder 100 may more accurately separate semantic information and visual appearance information of an input image. Thus, the computing device 10 may estimate a confidence score more accurately by eliminating unrelated features of the input image.

In one example, the input image is an image of a training dataset (i.e., a real image), when the training process is performed. In one example, the input image is a target to be detected, after the training process is completed.

In one example, the encoder 100 independently operates without the training module 110, e.g., when a termination condition (e.g., a number of iterations is equal to a default value) is satisfied. In this situation, the encoder 100 starts to generate a latent vector to disentangle the anomalous data from the normal data (i.e., to determine whether the input image is an anomaly).

In one example, the semantic latent vector is a one-hot vector, and each value of the semantic latent vector satisfies (e.g., follows) a predictive distribution. In one example, the input image is determined to be an anomaly, if a maximum confidence score of the semantic latent vector is equal to or smaller than a threshold value. In one example, the input image is determined to be not an anomaly, if a maximum confidence score of the semantic latent vector is higher than a threshold value. That is, the computing device 10 uses the semantic latent vector without the visual appearance latent vector for confidence estimation. The computing device 10 chooses the maximum confidence score of the semantic latent vector, and compares the maximum confidence score with the threshold value, to determine whether the input image is an anomaly. Thus, the computing device 10 determines whether the input image is an anomaly by eliminating unrelated features of the input image (i.e., the visual information). The problem that performance may be affected by complex backgrounds or content variants of the normal data or the anomalous data is solved.

In one example, a combination of the encoder 100 and the training module 110 may be called a variational autoencoder-generative adversarial network (VAE-GAN) module. In other words, the training module 110 may include a decoder and a discriminator (e.g., a discriminator module).

Figure 2:
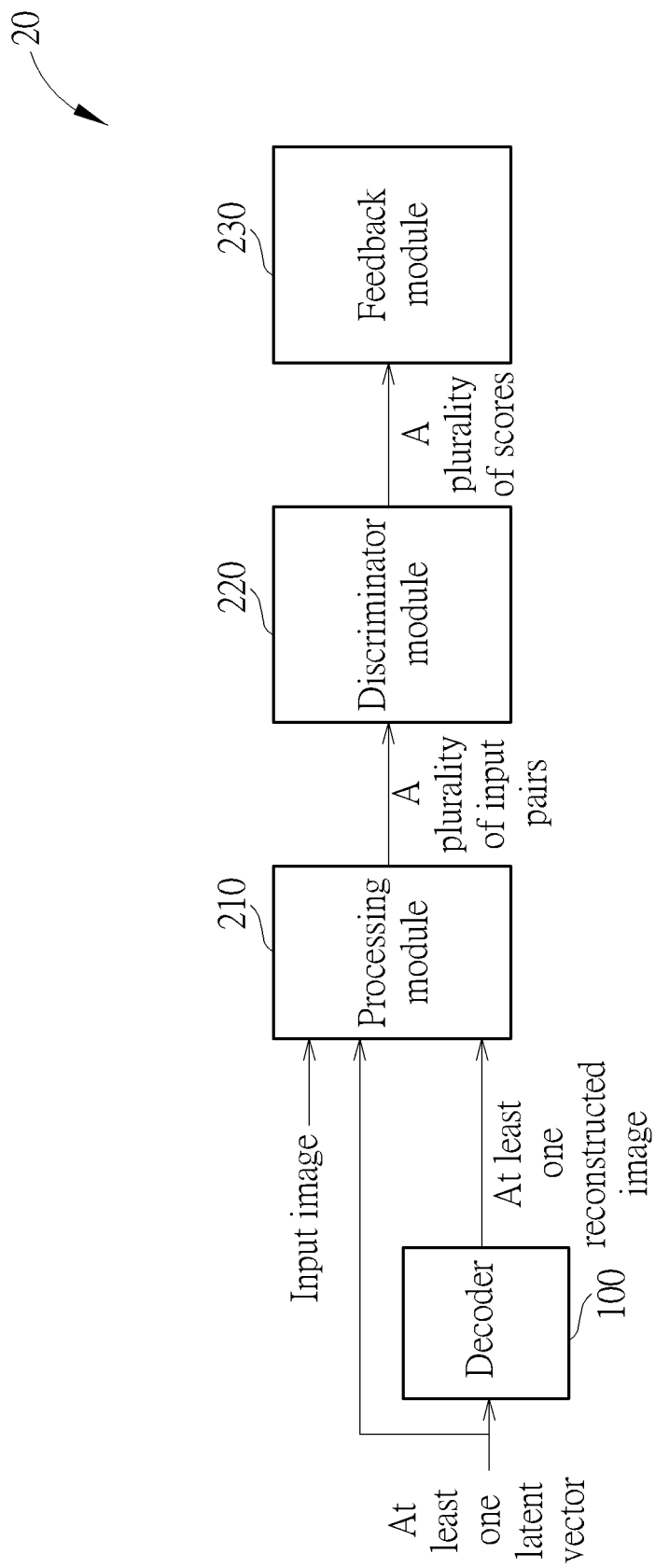
FIG. 2 is a schematic diagram of a training module according to an example of the present invention.

FIG. 2 is a schematic diagram of a training module 20 according to an example of the present invention. The training module 20 may be utilized for realizing the training module 110 in FIG. 1. The training module 20 includes a decoder 200, a processing module 210, a discriminator module 220 and a feedback module 230. The decoder 200 receives at least one latent vector, and generates at least one reconstructed image according to the at least one latent vector and at least one second parameter of the decoder 200. The processing module 210 is coupled to the decoder 200, and receives and processes the input image, the at least one latent vector and the at least one reconstructed image. Then, the processing module 210 generates a plurality of input pairs. The discriminator module 220 is coupled to the processing module 210, and receives the plurality of input pairs. The discriminator module 220 generates a plurality of scores according to the plurality of input pairs and at least one third parameter of the discriminator module 220. The feedback module 230 is coupled to the discriminator module 220, and receives the plurality of scores. The feedback module 230 updates the at least one first parameter, the at least one second parameter and the at least one third parameter according to the plurality of scores and the loss function.

In one example, the at least one vector is the first latent vector or a random sampled latent vector. For example, the decoder 200 receives the first latent vector, and generates a first reconstructed image. The decoder 200 receives the random sampled latent vector, and generates a second reconstructed image.

In one example, the random sampled latent vector includes a semantic latent vector and a visual appearance latent vector. In one example, the visual appearance latent vector of the random sampled latent vector may satisfy (e.g., follow) a multivariate normal distribution (e.g., a multivariate Gaussian distribution) $\mathcal{N}(0,I)$. In one example, The encoder 100 is regularized by imposing a distribution p(z), where $z \sim \mathcal{N}(0,I)$.

In one example, a combination of the encoder 100 and the decoder 200 may be called an autoencoder. In one example, a combination of the encoder 100 and the decoder 200 may be called a variational autoencoder (VAE).

In one example, a target of the decoder 200 is to generate a reconstructed image with a quality the same as that of the input image (i.e., the real image).

In one example, the processing module 210 receives an image (e.g., the input image or the at least one reconstructed image), and reduces dimensions of the image to generate a vector. Then, the processing module 210 concatenates the vector and a latent vector (e.g., the at least one latent vector), and generates an input pair.

In one example, one of the plurality of input pairs comprises the input image (i.e., the real image) and the visual appearance latent vector with at least one label of the input image, wherein the at least one label is ground truth as a semantic latent vector (i.e., the at least one label comprises ideal semantic information of the input image).

In one example, one of the plurality of input pairs comprises the at least one reconstructed image and the at least one latent vector. For example, an input pair comprises the first latent vector and a first reconstructed image, if the decoder 200 generates the first reconstructed image when receiving the first latent vector. An input pair comprises the random sampled latent vector and a second reconstructed image, if the decoder 200 generates the second reconstructed image when receiving the random sampled latent vector.

In one example, the discriminator module 220 constrains the decoder 200 to not ignore semantic latent vector of the at least one latent vector to generate the at least one reconstructed image.

In one example, the discriminator module 220 generates a score for distinguishing (e.g., determining or discriminating) how real (or fake) an input pair is (i.e., for distinguishing whether an image and a latent vector in the input pair are more likely to be from original data or reconstructed data generated by the encoder 100 or the decoder 200), after receiving the input pair. Larger difference between a plurality of scores represents that the discriminator module 220 distinguishes the plurality of input pairs more successfully.

Figure 3:
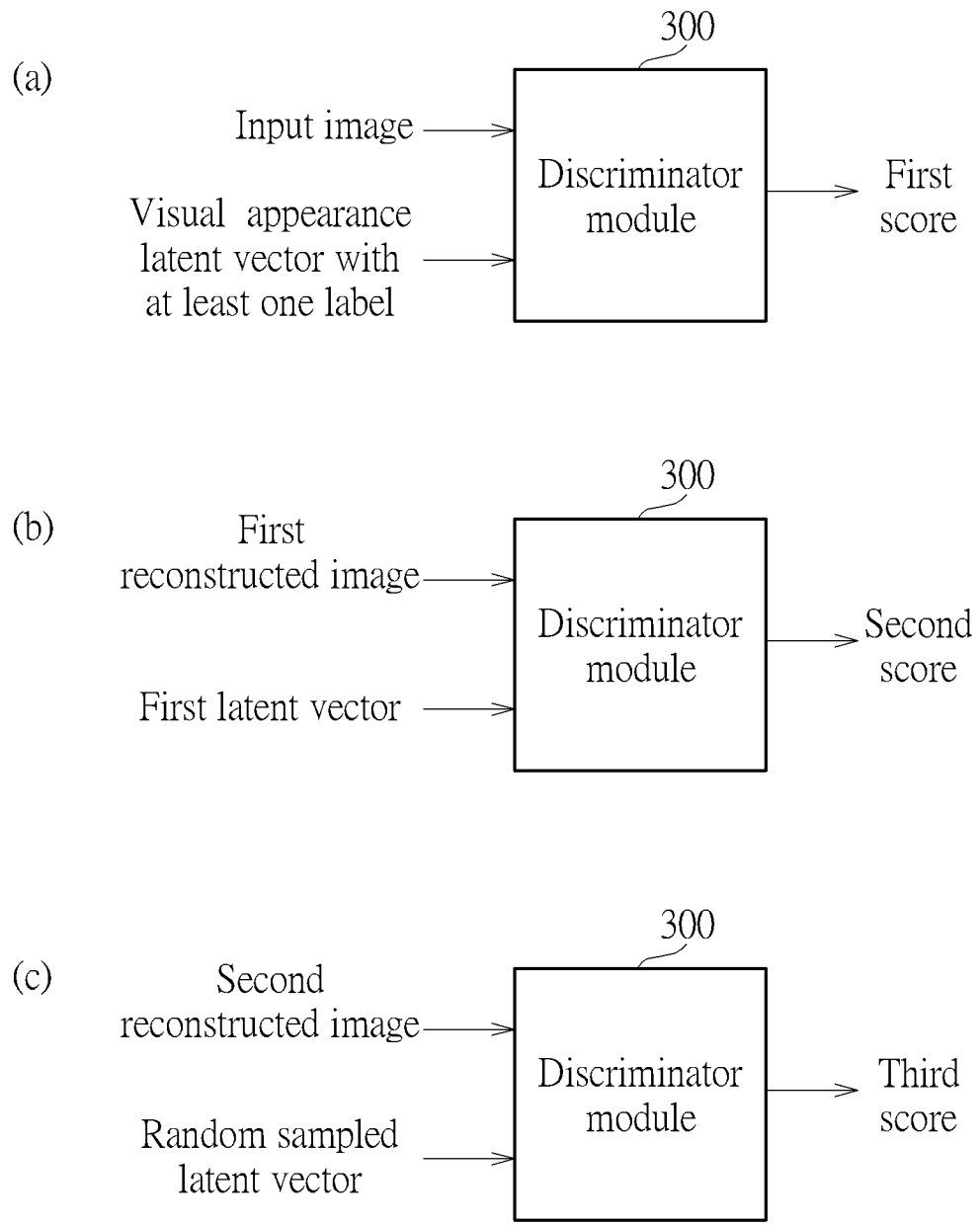
FIG. 3 is a schematic diagram of a discriminator module according to an example of the present invention.

FIG. 3 is a schematic diagram of a discriminator module 300 according to an example of the present invention. The discriminator module 300 may be utilized for realizing the discriminator module 220 in FIG. 2. The discriminator module 300 receives an input pair, and generates a corresponding score. There are three cases (a), (b) and (c) according to different contents of the input pair.

For the case (a), the discriminator module 300 receives an input pair including the input image (i.e., the real image) and the visual appearance latent vector with at least one label of the input image. The discriminator module 300 generates a first score according to the at least one third parameter, the input image and the visual appearance latent vector of the first latent vector with the at least one label.

For the case (b), the discriminator module 300 receives an input pair including the first latent vector and the first reconstructed image. The discriminator module 300 generates a second score according to the at least one third parameter, the first latent vector and the first reconstructed image.

For the case (c), the discriminator module 300 receives an input pair including the random sampled latent vector and the second reconstructed image. The discriminator module 300 generates a third score according to the at least one third parameter, the random sampled latent vector and the second reconstructed image.

It should be note that, the cases (a)-(c) may happen in the same iteration. That is, according to FIG. 3, the discriminator module 300 generates the first score, the second score and the third score, and transmits the above scores to the feedback module 230 in an iteration. Then, the feedback module 230 updates the at least one first parameter, the at least one second parameter and the at least one third parameter according to the loss function and these scores.

In one example, the feedback module 230 generates a first value according to the first score and the second score and the loss function. In one example, the feedback module 230 generates a second value according to the first score and the third score and the loss function. In one example, the feedback module 230 updates the at least one first parameter of the encoder 100 and the at least one second parameter of the decoder 200 according to the first value and the second value in an iteration. In one example, the feedback module 230 updates the at least one third parameter of the discriminator module 220 according to the first value and the second value in an iteration. In one example, the first value may be the same or different in each iteration. The second value may be the same or different in each iteration.

In one example, the feedback module 230 may generate the first value and the second value when updating the at least one first parameter and the at least one second parameter is requested (e.g., configurated), and the at least one third parameter may be fixed. In one example, the feedback module 120 may generate the first value and the second value when updating the at least one third parameter is requested (e.g., configurated), and the at least one first parameter and the at least one second parameter may be fixed. That is, the feedback module 120 updates parameter(s) of the encoder 100 and parameter(s) of the decoder 200 (or parameter(s) of the discriminator module 220) in an iteration, and the parameter(s) of the discriminator module 220 (or the parameter(s) of the encoder 100 and the parameter(s) of the decoder 200) is fixed.

In one example, the feedback module 230 uses an Adaptive Moment Estimation (ADAM) optimizer to update the at least one first parameter of the encoder 100 and the at least one second parameter of the decoder 200 according to the first value and the second value in an iteration. After the iteration for updating the at least one first parameter and the at least one first parameter, the discriminator module 220 receives a new plurality of input pairs and generates a new plurality of scores. New difference between the new plurality of scores may be smaller than present difference between a present plurality of scores.

In one example, the feedback module 230 uses an ADAM optimizer to update the at least one third parameter according to the first value and the second value in an iteration. After the iteration for updating the at least one third parameter, the discriminator module 220 generates a new plurality of scores according to at least one new third parameter of the discriminator module 220 that is updated when receiving the same plurality of input pairs. New difference between the new plurality of scores may be larger than present difference between a present plurality of scores.

In one example, the at least one first parameter and the at least one second parameter are updated, after the at least one third parameter is updated N times, wherein the N is a positive integer. In one example, the at least one third parameter is updated, after the at least one first parameter and the at least one second parameter are updated M times, wherein the M is a positive integer.

In one example, a training process (e.g., the above examples) not only encourages the decoder 200 to generate the at least one reconstructed image with a quality the same as that of realistic images, but also allows the encoder 100 to disentangle the semantic information and the visual information of the input images to the semantic latent vector and the visual appearance latent vector, respectively. In one example, the encoder 100 independently operates without the training module 110 (e.g., the training module 20), e.g., when the discriminator module 220 cannot distinguish a plurality of input pairs according to a plurality of scores (e.g., difference of the plurality of scores is close to zero). In this situation, the encoder 100 starts to generate a latent vector to disentangle the anomalous data from the normal data (i.e., to determine whether the input image is an anomaly).

In one example, the encoder 100 receives the at least one reconstructed image (i.e., the first reconstructed image) to generate a second latent vector, if the at least one vector received by decoder 220 is the first latent vector. In one example, the feedback module 230 calculates the loss function according to differences between the first latent vector and the second latent vector.

In one example, the loss function $L_{total}(E,D,DiS)$ comprises at least one regularizer (e.g., at least one regularization function), a categorical loss function (e.g., a supervised loss function), a Kullback-Leibler (KL) divergence function and a Wasserstein Generative Adversarial Network (WGAN) loss function. The at least one regularizer may be a reconstruction loss function $L_r(E,D)$ and a feature consistency loss function $L_r(E,D)$. In one example, the reconstruction loss function $L_r$ is a L1-norm function for calculating differences between the input image and the at least one reconstructed image (i.e., the first reconstructed image), if the at least one vector is the first latent vector. In one example, the feature consistency loss function $L_r(E,D)$ is a L1-norm function for calculating differences between the first latent vector and the second latent vector. The reconstruction loss function $L_r(E,D)$, the categorical loss function $L_c(E)$ and the feature consistency function $L_z(E,D)$ may be performed according to the following equations:

$$L_r(E,D)=\mathbb{E}_{x \sim P_{data}}\|-D(E(x))\|=\mathbb{E}_{c \sim E(x), z \sim E(x)}\|x-D(c,z)\|, \quad \text{(Eq. 1)}$$

$$L_c(E)=-\Sigma_i c_{G_i} \log(c_i), \quad \text{(Eq. 2)}$$

$$L_z(E,D)=\mathbb{E}_{x \sim P_{data}, z \sim E(x)}\|z-E(D(E(x)))\|, \quad \text{(Eq. 3)}$$

wherein x is the input image, $\mathbb{E}$ is an expected value formula, E(x) is a latent vector (e.g., the first latent vector or the second latent vector) generated by the encoder 100, D(c,z) is a reconstructed image (e.g., the at least one reconstructed image) generated by the decoder 200, c and z are a semantic latent vector and a visual appearance latent vector of the latent vector, respectively. $C_{G_i}$ represents label(s) of the input image (i.e., the at least one label).

The loss function $L_{total}(E,D,Dis)$ is optimized for solving an adversarial min-max problem, to update the at least one first parameter, the at least one second parameter and the at least one third parameter according to the loss function. The loss function may be performed according to the following equation:

$$L_{total}(E,D,Dis)=L(E,D,Dis)+L_{KL}(E)+\lambda_1 L_r(E,D)+\lambda_2 L_c(E)+\lambda_3 L_z(E,D), \quad \text{(Eq. 4)}$$

wherein L(E,D,Dis) is the WGAN loss function, $L_{KL}(E)$ is the KL divergence function, and the coefficients $\lambda_1$, $\lambda_2$ and $\lambda_3$ in the equation (Eq. 4) are fixed values.

In one example, the reconstruction loss function $L_r(E,D)$ is for maintaining structure of the input image. In one example, the categorical loss function $L_c(E)$ is for the encoder 100 to identify the semantic information of the input image as the semantic latent vector of the first latent vector. In one example, the reconstruction loss function $L_r(E,D)$ is for maintaining latent vector consistency in the visual appearance latent vectors.

FIG. 4 is a comparison table 40 of experiment results according to an example of the present invention. In FIG. 4, seven methods generate the experiment results with a Modified National Institute of Standards and Technology (MNIST) dataset: standard VAE, AnoGAN, Efficient GAN Based Anomaly Detection (EGBAD), GANomaly, Infinite Gaussian Mixture Model coupled with Generative Adversarial Networks (IGMM-GAN), Outlier Detection In Neural Networks (ODIN) and an example of the present invention. Then, the comparison table 40 shows the qualitative and quantitative experiment results by employing an Area Under the Receiver Operating Characteristic (AUROC) curve metric. To focus on more challenging multi-class anomaly detection, one class in the MNIST data is treated as an anomaly, and the rest of the classes in the MNIST data are treated as normal data. According to the comparison table 40, the experiment results show that the present invention performs better than the other methods.

Figure 5:
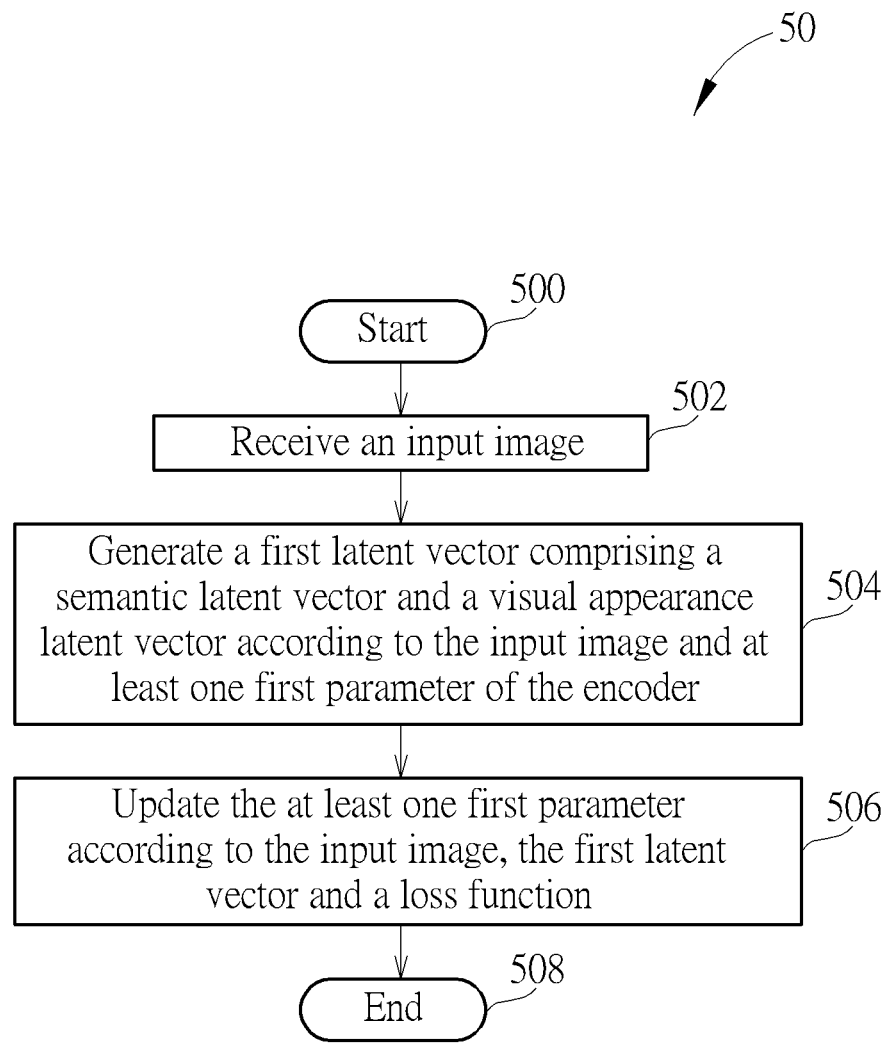
FIG. 5 is a flowchart of a process according to an example of the present invention.

Operations of the computing device 10 in the above examples can be summarized into a process 50 shown in FIG. 5. The process 50 is utilized in the computing device 10, and includes the following steps:

Step 500: Start.

Step 502: Receive an input image.

Step 504: Generate a first latent vector comprising a semantic latent vector and a visual appearance latent vector according to the input image and at least one first parameter of the encoder.

Step 506: Update the at least one first parameter according to the input image, the first latent vector and a loss function.

Step 508: End.

The process 50 is used for illustrating the operations of the computing device 10. Detailed description and variations of the process 50 can be referred to the previous description, and are not narrated herein.

Those skilled in the art should readily make combinations, modifications and/or alterations on the abovementioned description and examples. The abovementioned encoder, decoder, description, functions, modules and/or processes including suggested steps can be realized by means that could be hardware, software, firmware (known as a combination of a hardware device and computer instructions and data that reside as read-only software on the hardware device), an electronic system, or combination thereof.

Examples of the hardware may include analog circuit(s), digital circuit (s) and/or mixed circuit (s). For example, the hardware may include application-specific integrated circuit(s) (ASIC(s)), field programmable gate array(s) (FPGA(s)), programmable logic device(s), coupled hardware components or combination thereof. In one example, the hardware includes general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include Subscriber Identity Module (SIM), Read-Only Memory (ROM), flash memory, Random Access Memory (RAM), CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

To sum up, the present invention provides a computing device for handling anomaly detection (e.g., one-class anomaly detection and multi-class anomaly detection). The present invention disentangles semantic information and visual appearance information from input images, to reduce effects caused by complex backgrounds or content variants of the input images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computing device for handling anomaly detection, comprising:
   an encoder, for receiving an input image, to generate a first latent vector comprising a semantic latent vector and a visual appearance latent vector according to the input image and at least one first parameter of the encoder, wherein whether the input image is an anomaly or not is determined according to the semantic latent vector instead of the visual appearance latent vector; and a training module, coupled to the encoder, for receiving the input image and the first latent vector, to update the at least one first parameter according to the input image and the first latent vector and a loss function, wherein the training module comprises:

a decoder, coupled to the encoder, for receiving the first latent vector, to generate a first reconstructed image according to the first latent vector and at least one second parameter of the decoder, wherein the encoder receives the first reconstructed image to generate a second latent vector; and a feedback module, coupled to the encoder, for calculating the loss function according to differences between the first latent vector and the second latent vector.

2. The computing device of claim 1, wherein the input image is determined to be an anomaly, if a maximum confidence score of the semantic latent vector is lower than a threshold value.

3. The computing device of claim 1, wherein the semantic latent vector comprises semantic information of the input image, and does not comprise visual appearance information of the input image.

4. The computing device of claim 1, wherein the visual appearance latent vector comprises visual appearance information of the input image, and does not comprise semantic information of the input image.

5. The computing device of claim 1, wherein the decoder is configured for receiving a random sampled latent vector to generate a second reconstructed image according to the random sampled latent vector and the at least one second parameter of the decoder, and the training module comprises:

a processing module, coupled to the decoder, for processing the input image, at least one of the first reconstructed image and the second reconstructed image, and at least one of the first latent vector and the random sampled latent vector, to generate a plurality of input pairs; and a discriminator module, coupled to the processing module, for receiving the plurality of input pairs, to generate a plurality of scores according to the plurality of input pairs and at least one third parameter of the discriminator module;

wherein the feedback module, coupled to the discriminator module, is configured for receiving the plurality of scores, to update the at least one first parameter, the at least one second parameter and the at least one third parameter according to the plurality of scores and the loss function.

6. The computing device of claim 5, wherein one of the plurality of input pairs comprises the input image and the visual appearance latent vector with at least one label of the input image.

7. The computing device of claim 5, wherein one of the plurality of input pairs comprises the first reconstructed image and the first latent vector.

8. The computing device of claim 1, wherein the loss function comprises at least one regularizer, a categorical loss function, a Kullback-Leibler (KL) divergence function and a Wasserstein Generative Adversarial Network (WGAN) loss function.

9. The computing device of claim 8, wherein the at least one regularizer is a L1-norm function for calculating differences between the input image and the first reconstructed image.

10. The computing device of claim 5, wherein one of the plurality of input pairs comprises the second reconstructed image and the random sampled latent vector.

* * * * *